United States Patent [19]

Magoon

[11] Patent Number: 5,137,389
[45] Date of Patent: Aug. 11, 1992

[54] CLIP FOR FLUSH MOUNTING A PLATE WITHIN A CORRESPONDING OPENING IN AN EXTRUDED FRAME MEMBER

[75] Inventor: Robert D. Magoon, Alpharetta, Ga.
[73] Assignee: Kawneer Company, Inc., Norcross, Ga.
[21] Appl. No.: 717,392
[22] Filed: Jun. 19, 1991
[51] Int. Cl.⁵ ............................................. F16D 1/00
[52] U.S. Cl. ................................... 403/24; 403/406.1
[58] Field of Search ............................. 403/24, 406.1

[56] References Cited

U.S. PATENT DOCUMENTS

| | | | |
|---|---|---|---|
| 3,479,851 | 11/1969 | Davidson et al. | |
| 4,054,393 | 10/1977 | Talleri | 403/406.1 X |
| 4,124,319 | 11/1978 | Hollingsead | 403/24 |
| 4,514,105 | 4/1985 | Adams | 403/24 |

Primary Examiner—Andrew V. Kundrat
Attorney, Agent, or Firm—Jones, Askew & Lunsford

[57] ABSTRACT

A clip is disclosed for mounting a flush plate such as a mounting tray or the like within a corresponding opening in an extruded frame member such as a transom bar, door frame, or the like. The clip includes a pair of tongue members held together in spaced apart relation by an interconnecting bridge member. The tongue members are inserted into corresponding channels defined in the extruded frame member adjacent the opening, and when the clip is thus mounted to the frame member, a portion of the clip extends into the opening. In the disclosed embodiment, the bridge member is located to abut the end of the extruded frame member to limit the depth to which the clip is inserted into the channels. With the clips thus mounted, the flush plate is fastened to the clips to secure the flush plate to the extruded frame member. The clip is less expensive to produce than two corresponding single tongued clips and requires only one installation step rather than two. Further, the clip prevents the possibility of it being overdriven into the extruded frame member and reduces or eliminates the possibility of the clip being bent or twisted during installation. The clip also increases the accuracy of alignment of bores in the clip with corresponding apertures in the flush plate.

11 Claims, 4 Drawing Sheets

CLIP FOR FLUSH MOUNTING A PLATE WITHIN A CORRESPONDING OPENING IN AN EXTRUDED FRAME MEMBER

TECHNICAL FIELD

The present invention relates generally to an apparatus for flush mounting a plate within a corresponding opening in an extruded frame member and relates more specifically to a clip for flush mounting a door closer mounting tray within a corresponding opening in a transom bar.

BACKGROUND OF THE INVENTION

Various applications are known wherein a special clip is used to flush mount a plate within a corresponding opening in an extrusion. One such example is found in U.S. Pat. No. 3,479,851, wherein clips are used to flush mount a lock frame structure to an extruded door stile. The extruded door stile has an opening configured to receive the lock frame structure therewithin. The door stile extrusion has a longitudinal channel formed thereon which is intersected by the lock frame opening. Thus, portions of the channel lie adjacent opposite ends of the lock frame opening. The mounting clips each have a tongue portion and a head portion, the tongue portion being configured to be received within the channel of the extrusion, and the head portion extending into the lock frame opening and having a bore formed therein. The bores are positioned such that when the clips are installed on the door stile extrusion and the lock frame is positioned within the opening, corresponding bores in the lock frame align with the bores in the clips. Threaded fasteners are then used to secure the lock frame to the clips, thereby to mount the lock frame to the door stile extrusion.

While the clip arrangement disclosed in the aforementioned U.S. Pat. No. 3,479,851 provides generally satisfactory results when only a single clip is used at either end of the mounted object, somewhat different problems arise when such clips are used to mount a wider flush plate within an opening in an extrusion. An example of such an arrangement is shown in FIG. 1, wherein a prior art mounting tray is mounted within a corresponding opening in a transom bar to conceal a door opener. In this arrangement, the transom bar extrusion has parallel, spaced-apart channels formed therewithin, and a clip generally of the type disclosed in the aforementioned U.S. Pat. No. 3,479,851 is installed into each channel. Bores in the heads of the clips are supposed to align with corresponding spaced-apart bores in the mounting tray to receive threaded fasteners.

However, prior art clips of the type described suffer certain disadvantages. The clips can easily be under-or overdriven into their respective channels during installation such that the bore in the head of the clip does not align with the corresponding bore in the flush plate. The clips can also be easily bent or twisted during installation into their respective channels, thereby causing further alignment problems with the corresponding bores in the element being mounted. Also, such clips exhibit unsatisfactory resistance to lateral loads, since it is relatively easy for the clips to twist within their respective channels. Where wider elements are being mounted which require two clips in side-by-side relation, the installation is considerably more labor intensive, since installing two clips requires two separate installation steps. Also in a dual side-by-side clip arrangement, it is even more difficult to get the clips installed into their respective channels to the proper depth, since any errors in installing the two clips become cumulative in creating misalignment of the bores with respect to the flush plate being mounted.

SUMMARY OF THE INVENTION

As will be seen, the present invention overcomes these and other problems associated with prior art mounting methods for flush mounting plates to extrusions. Stated generally, the present invention comprises an extrusion defining an opening therewithin. The extrusion includes walls defining a pair of parallel channels adjacent the opening in the extrusion, the channels being separated by a predetermined distance. A clip comprises a pair of tongue elements and includes a bridge member connecting the tongue elements and maintaining them in spaced apart relation. The spaced apart relation of the tongue elements corresponds to the predetermined distance by which the parallel channels of the extrusion are separated such that an end of each of the pair of tongue elements can be inserted into a corresponding one of the pair of parallel channels. When the clip is mounted to the extrusion by inserting the tongue elements into the channels in the extrusion, a portion of the clip extends into the opening of the extrusion. In one aspect of the invention, when the clip is mounted to the extrusion in this manner, the bridge member limits the depth to which the tongue elements can be inserted into the channels. In the disclosed embodiment, the bridge member limits the depth of the clip by abutting engagement with the walls defining the channels of the extrusion. In one aspect of the invention, a flush plate such as a mounting tray, filler plate, or the like can mounted within the opening in the extrusion by fastening the flush plate to the clips installed onto the extrusion.

In another aspect, the present invention comprises a clip for mounting a flush plate within an opening in an extrusion having a pair of parallel channels separated by a predetermined distance adjacent the opening in the extrusion. The clip includes a pair of tongue elements and a bridge member connecting the pair of tongue elements and maintaining the tongue elements in spaced apart relation. The spaced apart relation of the tongue elements corresponds to the predetermined distance by which the parallel channels of the extrusion are separated such that an end of each of the pair of tongue elements can be inserted into a corresponding one of the pair of parallel channels. When the tongue elements are inserted into the channels, a portion of the clip extends into the opening of the extrusion. In the disclosed embodiment, when the clip is installed onto the extrusion in this manner, the bridge member limits the depth to which the tongue elements can be inserted into the channels. A flush plate such as a mounting tray, cover plate, or the like can be fastened to the clip to mount the flush plate within the opening in the extrusion. In the disclosed embodiment, the flush plate comprises an aperture formed therethrough, and the clip comprises means defining a bore within that portion of the clip which extends into the opening of the extrusion. The bore is located such that when the pair of tongue elements are inserted into the channels until the bridge abuts the end of the extrusion, the bore in the clip is aligned with the aperture formed in the flush plate, whereby a fastener can be inserted through the aperture in the flush plate and the bore in the clip to mount the flush plate within the opening in the extrusion.

Thus, it is an object of the present invention to provide an improved arrangement for installing clips onto an extrusion having spaced apart channels.

It is another object of the present invention to provide an improved clip for mounting a flush plate, such as a mounting tray or cover plate, within a corresponding opening in an extruded member such as a transom bar, door frame, or the like.

Yet another object of the present invention is to provide a clip for mounting a flush plate within a corresponding opening in an extruded frame member which more accurately aligns a bore of the clip with a corresponding bore in the flush plate.

It is another object of the present invention to provide a clip for mounting a flush plate within a corresponding opening in an extruded frame member which eliminates the possibility of over-driving the clip into its corresponding channel.

Still another object of the present invention to provide a clip for mounting a flush plate within a corresponding opening in an extruded frame member which reduces or eliminates the possibility of twisting or bending the clip during installation into its corresponding channels.

Another object of the present invention is to provide a clip for mounting a flush plate within a corresponding opening in an extruded frame member which is less expensive to manufacture and requires less labor to install.

It is still another object of the present invention to provide a clip for mounting a flush plate within a corresponding opening in an extruded frame member which exhibits increased resistance to lateral loads.

Other objects, features, and advantages of the present invention will become apparent upon reading the following specification, when taken in conjunction with the drawings and the appended claims.

DETAILED DESCRIPTION OF THE DISCLOSED EMBODIMENT

Figure 2:
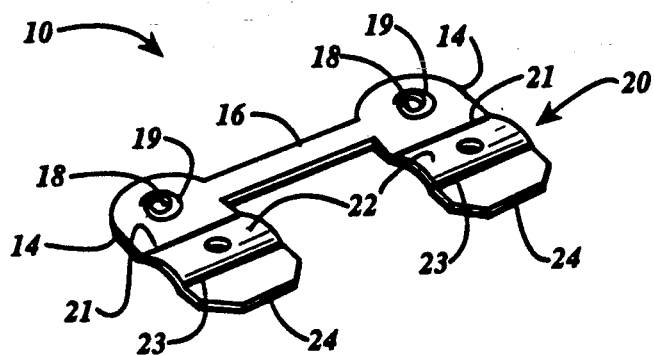
FIG. 2 is a perspective view of a mounting clip according to the present invention.

Referring now in more detail to the drawings, in which like numerals indicate like elements throughout the several views, FIG. 2 shows a clip 10 for flush mounting a plate within a corresponding opening in an extrusion, according to the present invention. The clip 10 is stamped from steel or other suitable material and has a pair of spaced-apart tongue members 12 at one end and a pair of spaced apart head portions 14 at the other end. A bridge 16 connects the two tongue members 12 and holds them in parallel, spaced-apart relation. A bore 18 is formed in each of the head portions 14, and a spiral-shaped formed nut 19 is formed on the upper surface of each head portion 14 coaxially with each bore 18. Each of the tongue members 12 includes an upwardly arched portion 20 beginning at a location 21 adjacent the bridge 16. The arched portion 20 includes an apex 22, from which the tongue member arches downward to a location 23 toward the forward end 24 of each tongue member. The function and purpose of the arched portions 20 of the tongue members 12 will become apparent when the installation of the clip 10 is explained hereinbelow.

Figure 3:
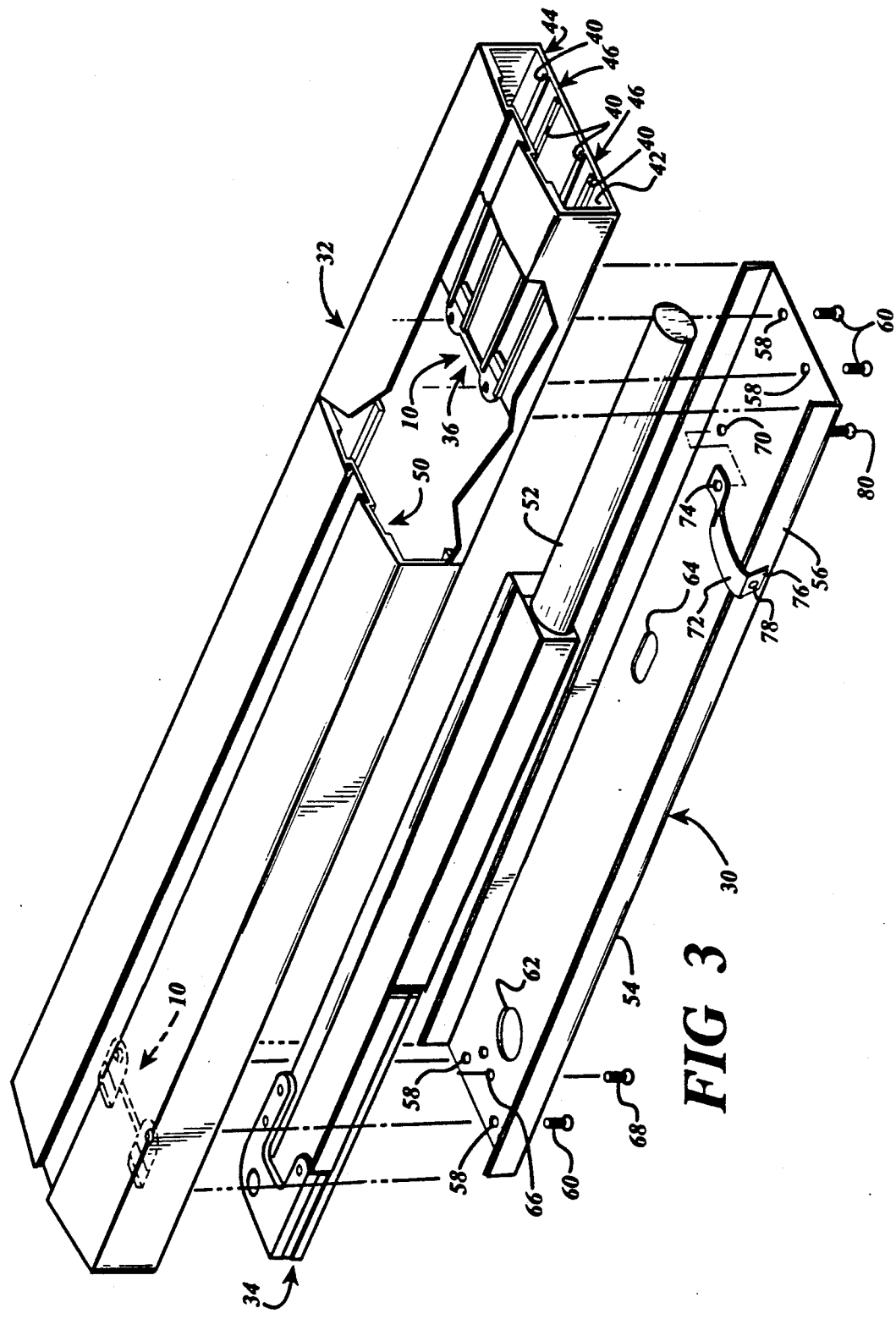
FIG. 3 is an exploded perspective view illustrating the use of the clip of FIG. 2 to mount a flush plate to an extruded frame member to conceal a door closer mechanism.

FIG. 3 shows the use of the clips 10 for flush mounting a tray 30 to a transom bar 32 to conceal a door closer mechanism 34 therewithin. The transom bar 32 is a hollow aluminum extrusion and includes a bottom wall 36. Two pairs of longitudinally extending L-shaped walls 40 extend upwardly from the upper surface 42 of the bottom wall 36 of the transom bar 32 to define a pair of parallel, spaced apart channels 46. The transom bar 32 further comprises a mounting tray opening 50 defined in the bottom transom bar wall 36. The tray opening 50 interrupts the longitudinal channels 46 such that there are portions of the channels 46 which lie adjacent to the opening 50.

The door closer mechanism 34 is of conventional design and includes a pivot shaft or spindle 51 and a closer stack tube 52.

Figure 8:
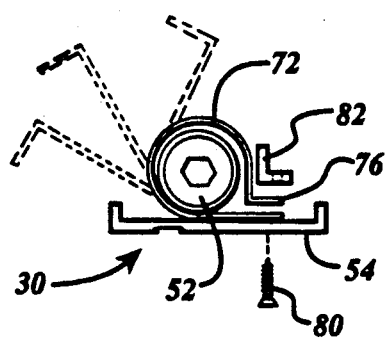
FIGS. 8 and 9 are end views showing additional steps in the installation of the retainer strap of FIG. 7 to secure the door closer mechanism to the flush plate.
Figure 9:
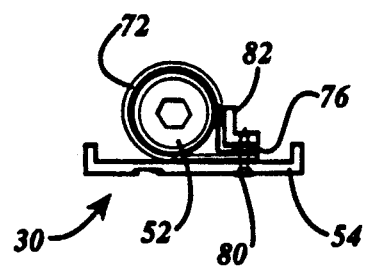

The mounting tray 30 is a generally U-shaped concave extrusion having a bottom panel 54 and opposing side panels 56 extending upwardly from the lateral edges of the bottom panel. The bottom panel 54 has an upper surface 57 and has two pairs of bores 58 formed through the bottom panel for receiving the threaded shanks of mounting screws 60 in a manner to be described below. The bottom panel 54 of the tray 30 includes a circular spindle opening 62 for receiving the spindle 51 (FIG. 6) of the door closer mechanism 34 therethrough. The bottom panel 54 of the tray 30 further includes a bore 66 adjacent the spindle opening 62 for receiving a mounting screw 68. At the other end of the mounting tray 30, another bore 70 is formed in the bottom panel 54. A retainer strap 72 is provided for securing the closer stack tube 52 of the door closer mechanism 34 to the mounting tray 30. The retainer strap 72 has a first hole 74 at one end and an angled tab 76 at its other end. A second hole 78 is formed through the tab 76 such that the retainer strap can be bent into a circular shape with the hole 74 at the first end of the strap aligned with the hole 78 in the tab 76. A screw 80 fits through the bore 70 in the bottom panel 54 of the mounting tray and through the aligned bores 74, 78 in the strap 72. The screw 80 is threaded into an L-shaped angle clamp 82 (FIGS. 8, 9).

Figure 4:
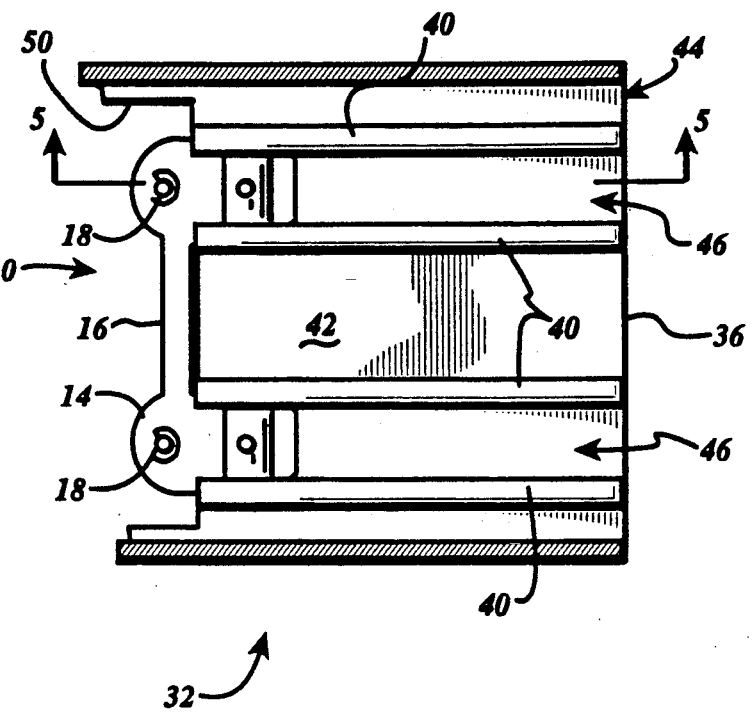
FIG. 4 is a top cutaway view of the extruded frame member of FIG. 3 showing the clip installed.

The installation sequence of the mounting tray 30 to the transom bar 32 will now be explained. Two clips 10 are installed onto the transom bar 32, one at either end of the tray opening 50. To install each clip 10 onto the transom bar 32, the forward ends 24 of the tongue members 12 are inserted into the portions of the channels 46 which lie adjacent to the tray opening 50. The clip 10 is inserted into the channels 46 until the bridge 16 abuts the ends of the L-shaped walls 40 adjacent the tray opening 50, as shown in FIG. 4. The abutting action of the bridge 16 against the ends of the L-shaped walls 40 thus limits the extent to which the tongue members 12 of the clip 10 can be inserted into the channels 46 of the transom bar 32.

Figure 5:
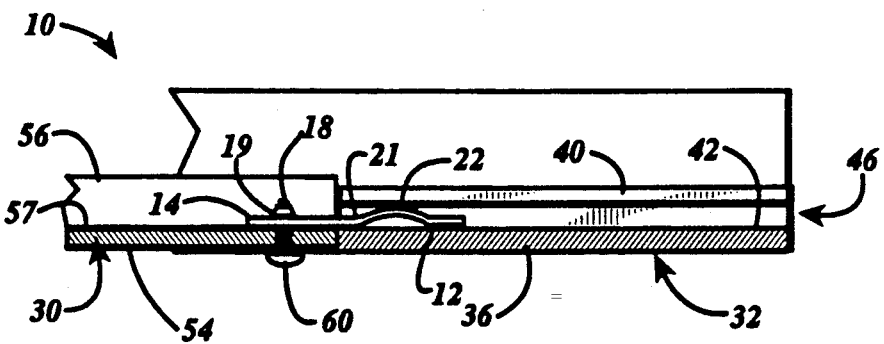
FIG. 5 is a side cutaway view along line 5—5 of FIG. 4 showing the flush plate of FIG. 3 mounted to the extruded frame member.

As can be seen in FIG. 5, the arched portions 20 of the clips 10 help ensure a snug engagement of the tongue members 12 within the corresponding channels 46. The arched portions 20 are configured such that the vertical distance between the lower surface of the clip 10 and the apexes 22 of the arched portions 20 is slightly greater than the height of the channels 46. As the clips 10 are inserted into the channels 46, the arched portions 20 are slightly flattened out as they are wedged between the upper and lower walls of the channels 46. The resiliency of the arched portions 20 exerts a constant vertical force against the upper and lower walls of the channels 46 to retain the clips 10 snugly within the channels. As can also be seen in FIG. 5, when the clips 10 are installed into their respective channels 46, the lower surface of the head portion 14 of each clip 10 is flush with the upper surface 42 of the bottom wall 36 of the transom bar 32.

Figure 6:
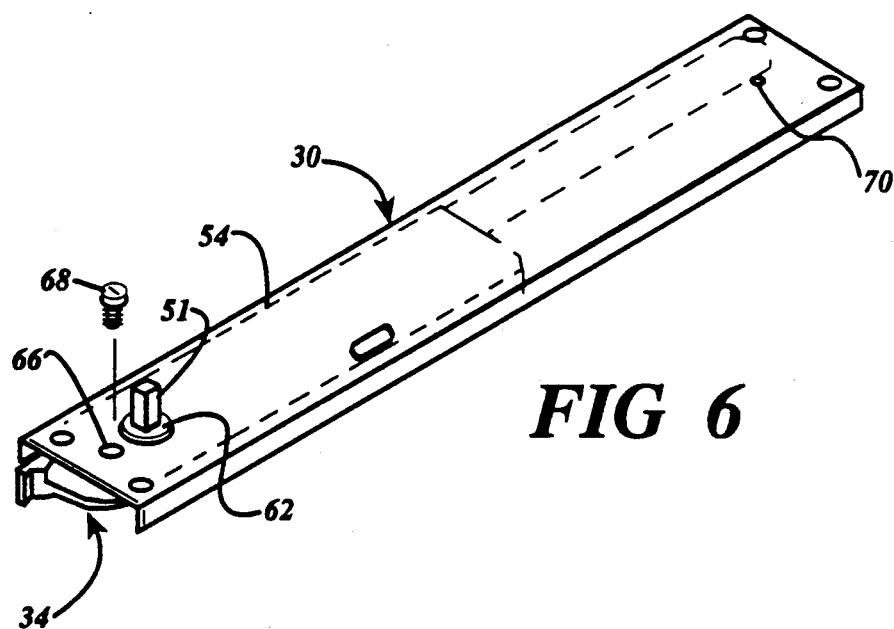
FIG. 6 is a perspective view depicting the installation of the door closer mechanism of FIG. 3 to its associated flush plate.

With the clips 10 thus installed onto the transom bar 32, the door closer mechanism 34 is mounted onto the mounting tray 30 in the manner illustrated in FIGS. 6-9. Referring first to FIG. 6, the door closer mechanism 34 is first laid on a support surface with its spindle 51 facing upwardly. The tray 30 is then laid on top of the door closer mechanism 34 with the spindle 51 being received through the circular opening 62 in the bottom panel 54 of the tray. The mounting screw 68 is inserted through the bore 66 and threaded into a corresponding threaded bore in the door closer mechanism 34.

Figure 7:
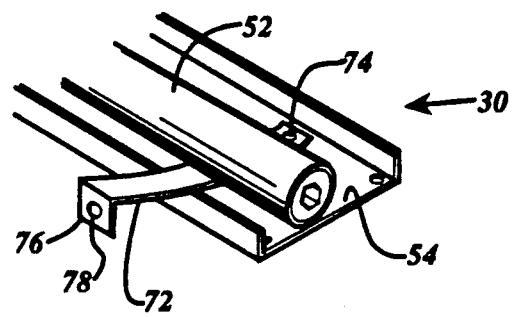
FIG. 7 is a perspective view depicting the installation of a retainer strap to secure one end of the door closer mechanism of FIG. 3 to the flush plate.

Referring now to FIGS. 7-9, the retainer strap 72 is slipped under the closer stack tube 52 with the tab 76 pointing down. The first hole 74 in the retainer strap 72 is aligned with the bore 70 in the bottom panel 54 of the closer tray 30, and the anchor screw 80 is inserted through the bore 70 and through the first hole 74 in the retainer strap. The remaining portion of the retainer strap 72 is then wrapped around the stack tube 52 as shown in FIG. 7, and the tab 76 is placed over the threaded shaft of the anchor screw 80. The L/shaped angle clamp 82 is then placed over the anchor screw 80, and the screw is tightened to draw the clamp down securely against the closer tray.

With the door closer mechanism 34 positioned and secured onto the mounting tray 30 as disclosed, the mounting tray 30 is positioned into the tray opening 50 in the bottom wall 36 of the transom bar 32. When properly positioned, the lower surface of the bottom panel 54 of the mounting tray 30 is flush with the lower surface of the bottom wall 36 of the transom bar 32, and the upper surface 57 of the bottom panel 54 of the mounting tray 30 bears against the lower surface of the head portions 14 of the clips 10. When so positioned, the bores 58 in the bottom panel 54 of the mounting tray 30 are aligned with the bores 18 in the head portions 14 of the clips 10. The mounting screws 60 are then inserted through the bores 58 in the bottom panel 54 and into the corresponding bores 18 in the clip 10 to secure the mounting tray 30 to the transom bar 32. A door (not shown) is then mounted to the spindle 51 of the door closer mechanism 34 in the conventional manner.

In the disclosed embodiment, the clips 10 have integral formed nuts cooperatively fashioned with the bores 18 by which the threaded shanks of the mounting screws 60 threadingly engage the clips. However, it will be appreciated that the clip 10 may alternatively be provided with smooth bores and that the mounting screws 60 may be self-threading to thread the bores of the clips as the screws are installed. Other suitable arrangements for providing a mechanical connection between the mounting screws 60 and the head portions 14 of the clips 10 may occur to those skilled in the art.

Figure 1:
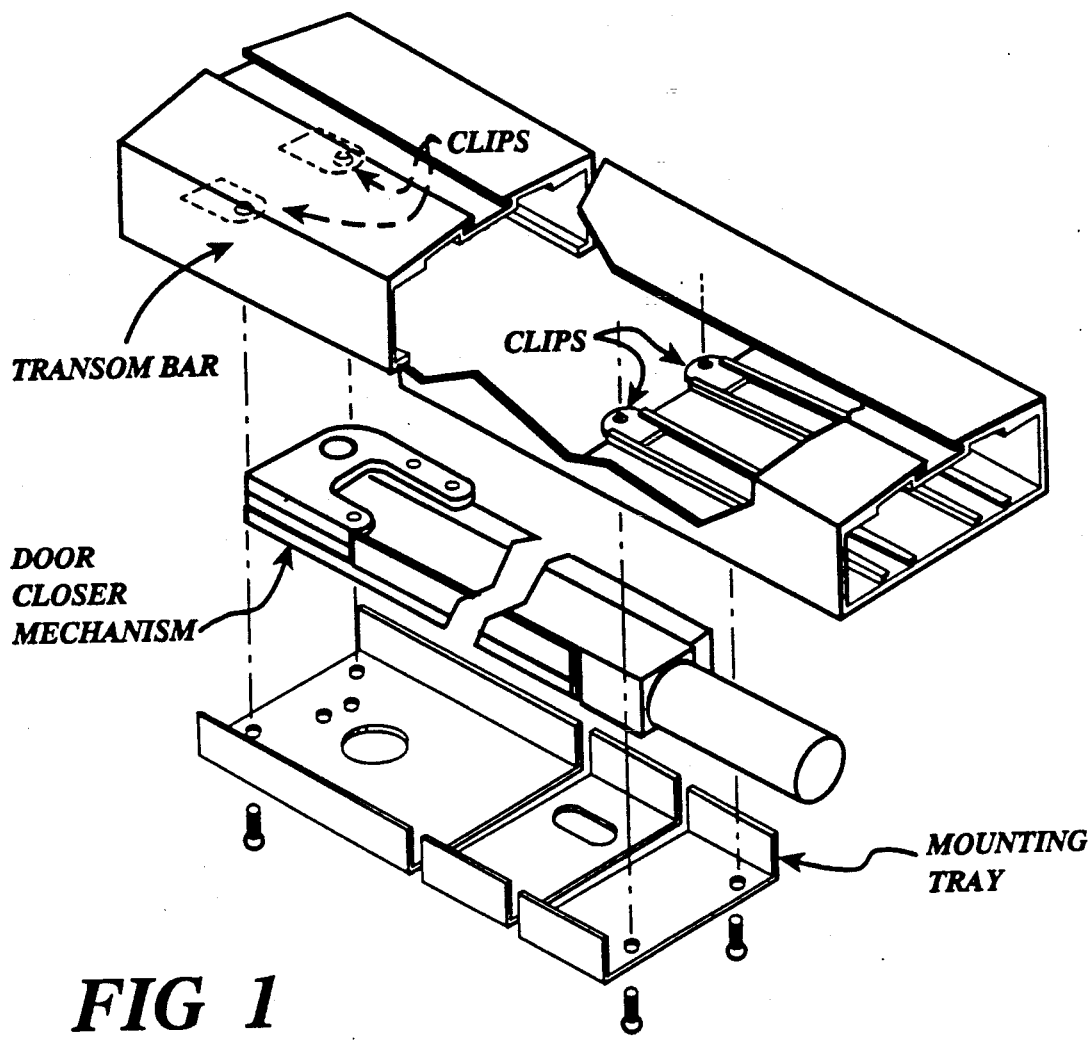
FIG. 1 is an exploded perspective view of a prior art arrangement employing clips for mounting a flush plate to an extruded frame member.

The clip 10 of the present invention provides significant advantages over prior art clips of the type disclosed in FIG. 1. First, the abutting action of the bridge 16 against the ends of the walls 42 defining the channels 46 controls the depth to which the clips 10 are inserted into the channels. The clip 10 is thus prevented from being over- or under-inserted into its respective channel 46 and thus ensures proper alignment of the bores 18 in the clip with the corresponding bores 58 in the mounting tray 30. The provision of two tongue members 12 engaging two channels 46 also prevents the clip 10 from twisting or otherwise being misaligned during installation. Further, once installed the clip 10 provides greater resistance against twisting, since two tongue members 12 and the bridge member 16 bearing against the walls 42 of the channels 46 provides greater lateral stability than a single tongue member within a single channel. Also, the clip 10 is less expensive to manufacture than two prior art clips of the type disclosed in FIG. 1. Finally, since only a single installation procedure need be performed to install a clip 10, rather than two separate installation steps required to install two prior art clips, labor costs for installation are reduced commensurately.

While the preferred embodiment has been disclosed with respect to a clip for flush mounting a mounting tray within a corresponding opening in a transom bar, it will be appreciated that the clip may be used for any other application wherein a plate is being flush mounted within an opening in an extrusion having spaced apart channels. Examples of other applications might include flush mounting door lock hardware to a door jamb or flush mounting an access plate to a frame member. Also, while the arched portions 20 in the tongue members 12 help facilitate a firm engagement of the clips 10 within their corresponding channels 46, it will be understood that such arched portions are not required, and that other measures for ensuring a snug engagement, including by way of example closer control over manufacturing tolerances, may be used to achieve a snug fit between the tongue members and their corresponding channels.

Finally, it will be understood that the preferred embodiment has been disclosed by way of example, and that other modifications may occur to those skilled in the art without departing from the scope and spirit of the appended claims.

What is claimed is:
1. An apparatus comprising:
   an extruded frame member defining an opening therein, said frame member including walls defining a pair of parallel channels therein adjacent said opening, said channels being separated by a predetermined distance; and a clip having a pair of tongue elements configured to be received within said pair of channels in said extrusion, said clip further having a bridge member connecting said pair of tongue elements and maintaining said pair of tongue elements in spaced apart relation, said spaced apart relation coresponding to said predetermined distance by which said parallel channels of said extruded frame member are separated such that an end of each of said pair of tongue elements can be inserted into a corresponding one of said pair of parallel channels, a portion of said clip extending into said opening defined by said extruded frame member when said tongue elements of said clip are inserted into said pair of parallel channels.

2. The apparatus of claim 1, wherein said bridge member of said clip limits the depth to which said pair of tongue elements can be inserted into said pair of channels.

3. The apparatus of claim 2, wherein said bridge member is disposed to abut said walls defining said channels of said extruded frame member when said tongue members are inserted into said channels to a predetermined depth, said bridge member thereby limiting the depth to which said pair of tongue elements can be inserted into said pair of channels.

4. The apparatus of claim 1, further comprising a flush plate which is positioned within said opening in said extruded frame member and fastened to said clip to mount said flush plate within said opening of said extruded frame member.

5. The apparatus of claim 4, wherein said extruded frame member comprises a transom bar having an opening formed therein, and wherein said flush plate comprises a cover tray dimensioned to be received within and to cover said opening in said transom bar.

6. The apparatus of claim 2, wherein said clip further comprises means defining a bore therewithin, said bridge member being disposed with respect to said bore such that when said pair of tongue elements is inserted into said channels, said bridge controls the depth to which said pair of tongue elements is inserted into said channel to control the location of said bore with respect to said opening of said extruded frame member.

7. The apparatus of claim 6, further comprising a flush plate having an aperture formed therethrough such that when said flush plate is positioned within said opening in said extruded frame member, said aperture is aligned with said bore in said clip, whereby a fastener can be inserted through said aperture in said flush plate and through said bore in said clip to mount said flush plate within said opening in said extruded frame member.

8. The apparatus of claim 7, wherein said extruded frame member comprises a transom bar having an opening formed therein, and wherein said flush plate comprises a cover tray dimensioned to be received within and to cover said opening in said transom bar.

9. A clip for mounting a flush plate within a corresponding opening in an extruded frame member, said extruded frame member including walls defining a pair of parallel channels therein adjacent said opening, and said channels being separated by a predetermined distance, said clip comprising:

a pair of tongue elements dimensioned to be received within said pair of channels; and a bridge member connecting said pair of tongue elements and maintaining said tongue elements in spaced apart relation, said spaced apart relation corresponding to said predetermined distance by which said parallel channels of said extruded frame member are separated such that an end of each of said pair of tongue elements can be inserted into a corresponding one of said pair of parallel channels, said clip being configured such that when said tongue elements of said clip are inserted into said pair of parallel channels, a portion of said clip extends into said opening defined by said extruded frame member, whereby said flush plate can be positioned within said opening and fastened to said clip to mount said flush plate within said opening in said extruded frame member.

10. The apparatus of claim 9, wherein said bridge member limits the depth to which said pair of tongue elements can be inserted into said pair of channels.

11. The apparatus of claim 9, wherein said flush plate further comprises apertures formed therethrough at spaced apart locations, and wherein said clip further comprises means defining a pair of bores therewithin, said bores being located such that when said pair of tongue elements are inserted into said channels until said bridge abuts said one end of said extruded frame member, said bores in said clip correspond with said apertures formed in said flush plate, whereby fasteners can be inserted through said apertures in said flush plate and said bores in said clip to mount said flush plate within said opening in said extruded frame member.

* * * * *